United States Patent
Gu

(10) Patent No.: US 12,421,401 B2
(45) Date of Patent: Sep. 23, 2025

(54) COATING COMPOSITIONS FOR HYDROPHOBIC FILMS AND ARTICLES HAVING HYDROPHOBIC SURFACES

(71) Applicant: W.R. GRACE & CO.-CONN., Columbia, MD (US)

(72) Inventor: Feng Gu, Ellicott City, MD (US)

(73) Assignee: W.R. GRACE & CO.- CONN., Columbia, MD (US)

( * ) Notice: Subject to any disclaimer, the term of this patent is extended or adjusted under 35 U.S.C. 154(b) by 1028 days.

(21) Appl. No.: 17/600,851

(22) PCT Filed: Mar. 31, 2020

(86) PCT No.: PCT/US2020/025988
§ 371 (c)(1),
(2) Date: Oct. 1, 2021

(87) PCT Pub. No.: WO2020/205879
PCT Pub. Date: Oct. 8, 2020

(65) Prior Publication Data
US 2022/0363919 A1    Nov. 17, 2022

Related U.S. Application Data

(60) Provisional application No. 62/829,198, filed on Apr. 4, 2019.

(51) Int. Cl.
| | |
|---|---|
| *C09D 7/62* | (2018.01) |
| *C08K 3/36* | (2006.01) |
| *C08K 9/06* | (2006.01) |
| *C09D 5/00* | (2006.01) |
| *C09D 7/40* | (2018.01) |
| *C09D 127/18* | (2006.01) |

(52) U.S. Cl.
CPC ............. *C09D 7/62* (2018.01); *C09D 5/00* (2013.01); *C09D 7/68* (2018.01); *C09D 7/69* (2018.01); *C09D 127/18* (2013.01); *C08K 3/36* (2013.01); *C08K 9/06* (2013.01); *C08K 2201/003* (2013.01); *C08K 2201/005* (2013.01); *C08K 2201/006* (2013.01)

(58) Field of Classification Search
None
See application file for complete search history.

(56) References Cited

U.S. PATENT DOCUMENTS

| | | |
|---|---|---|
| 3,279,992 A | 10/1966 | Irani et al. |
| 6,683,126 B2 | 1/2004 | Keller et al. |
| 8,354,160 B2 | 1/2013 | Jing et al. |
| 9,616,695 B2 | 4/2017 | Nagoshi et al. |
| 2005/0223945 A1 | 10/2005 | Baumgart et al. |
| 2008/0026163 A1 | 1/2008 | Hamaguchi et al. |
| 2009/0018249 A1 | 1/2009 | Kanagasabapathy et al. |
| 2012/0322940 A1* | 12/2012 | Mueller ............. D06N 3/128 524/588 |
| 2013/0178581 A1* | 7/2013 | Heldmann ............ C08G 77/58 524/588 |
| 2014/0296558 A1 | 10/2014 | Raichle et al. |
| 2018/0009997 A1* | 1/2018 | Bhagwagar .......... C09D 183/06 |

FOREIGN PATENT DOCUMENTS

| | | | | |
|---|---|---|---|---|
| CN | 102575433 A | | 7/2012 | |
| EP | 1 640 419 A1 | | 3/2006 | |
| JP | 2002-038102 A | | 2/2002 | |
| JP | 2004090420 A | * | 3/2004 | |
| JP | 2018027641 A | * | 2/2018 | |
| JP | 2021-5258418 A | | 9/2021 | |
| TW | 201631074 A | * | 9/2016 | ............. C08F 2/44 |
| WO | WO-2008/000570 A1 | | 1/2008 | |

OTHER PUBLICATIONS

Takahara et al., TW-201631074-A, Sep. 1, 2016 (machine translation) (Year: 2016).*
Takagi et al., JP-2018027641-A, Feb. 22, 2018 (machine translation) (Year: 2018).*
Onozawa et al., JP-2004090420-A, Mar. 25, 2004 (machine translation) (Year: 2004).*
Foreign Search Report on EP patent application No. 20784052.1 dated Jan. 2, 2023 (12 pages).
Werner R et al: 11Effect of surface modification on physicochemical properties of precipitated sodium-aluminium silicate, used as a pigment in acrylic dispersion paints11 ,Dyes and Pigments, Elsevier Applied Science Publishers Barking, GB, vol. 50, No. 1, Jul. 1, 2001 (Jul. 1, 2001), pp. 41-54, XP004255246, ISSN: 0143-7208, DOI: 10.1016/S0143-7208(01)00029-8.
International Search Report dated Jun. 9, 2020, issued in counterpart International Application No. PCT/US2020/025988. (2 pages).
Written Opinion of the International Searching Authority (Form PCT/ISA/237) dated Jun. 9, 2020, issued in counterpart International Application No. PCT/US2020/025988. (7 pages).

* cited by examiner

*Primary Examiner* — Cheng Yuan Huang
(74) *Attorney, Agent, or Firm* — DORITY & MANNING, P.A.

(57) ABSTRACT

This invention relates to a coating composition. The coating composition may include hydrophobized aluminum silicate particles, a film-forming binder, and a solvent. the hydrophobized aluminum silicate particles comprise aluminum silicate particles having a pore diameter of about 50 Å or more and a hydrophobic coating on a surface of the aluminum silicate particles.

29 Claims, No Drawings

COATING COMPOSITIONS FOR HYDROPHOBIC FILMS AND ARTICLES HAVING HYDROPHOBIC SURFACES

FIELD OF THE INVENTION

The present invention relates to the making and the use of the hydrophobic particles to produce a surface with difficult-to-wet property. In particular, the present invention relates to hydrophobilized aluminum silicate particles, coating compositions comprising these hydrophobilized aluminum silicate particles, coated surfaces that are difficult-to-wet using these coating compositions, and processes for producing such difficult-to-wet surfaces.

BACKGROUND

Usual surfaces are generally wetted by liquids such as water. The degree of wetting is the result of interplay between the forces of cohesion in the liquid and the forces of adhesion between liquid and surface.

In many cases, the wetting of a surface by a liquid is unwanted. For example, the wetting of surfaces with water results in the retention of water droplets on the surface and their evaporation, with the solids suspended or dissolved in the water remaining as unsightly residues on the surface. This problem exists in particular with surfaces exposed to rainwater. The wetting of a surface with water is frequently also a trigger for its corrosion or for infestation with microorganisms and with growths such as algae, lichen, mosses, bivalves, etc.

In the context of packaging and storage vessels for liquids, low wettability of the interior surfaces is desired, so that none or only small amounts of liquid remain when the packaging or storage vessel is emptied. In the field of apparatus and plant construction, as well, low wettability of components which come into contact with liquids is desired. If, indeed, the wettability of the components is high, there is a risk of increased formation of coverings and deposits. Furthermore, increased wettability generally has the consequence of increased flow resistance of liquids in pipelines.

It is known that the wettability of a surface by hydrophilic liquids may be reduced by a hydrophobic coating of the surface. Examples for suitable coating materials in this context include hydrophobic waxes, polyalkylsiloxanes and perfluorinated polymers, especially the extremely hydrophobic polytetrafluoroethylene (Teflon). The coating reduces the forces of adhesion between liquid and wetted surface.

Furthermore, it has proven favorable to have structured hydrophobic surfaces. Surface structures of this kind generally have regular or irregular elevations or depressions in nanometer or micrometer scale. These structures, often referred as surface roughness, invite the participation of air to repel liquid such as water. As described by Cassie-Baxter Equation below:

$$\cos \theta_{CB} = f^* \cos \theta - (1-f)$$

In the equation, $\theta_{CB}$ is the water droplet contact angle of the rough surface made with certain hydrophobic material in the coated layer, $\theta$ is water droplet contact angle of the smooth surface material itself, and f is the fraction of water contacted surface area to the total surface area, and thus (1−f) is the fraction of the non-contacted area (air pockets) to the total surface area. In order to achieve $\theta_{CB}$ close to 180° (i.e., when $\cos \theta_{CB}$ close to −1, $\cos \theta$ is close to 0), it is desirable to have very small f values.

Superhydrophobic surfaces are surfaces on which contact angles of a water droplet exceed 150°, and it is generally recognized that superhydrophobic surfaces require both hydrophobic material and surface roughness. In nature, mono-microstructure model for lotus leaves with superhydrophobicity and self-cleaning properties was reported in 1997 (Barthlott, W.; Neinhuis, C. "Purity of the sacred lotus, or escape from contamination in biological surfaces," Planta 1997, 202 (1), 1-8) and it was described as caused by micro scaled papillae and hydrophobic epicuticular wax.

U.S. Pat. No. 6,683,126 discloses a coating composition for producing difficult-to-wet surfaces. The coating composition may include at least one finely divided powder which has a hydrophobic surface and a porous structure characterized by a BET surface area of at least 1 $m^2/g$ and at least one film-forming binder characterized by a surface tension <50 mN/m. The weight ratio of powder to binder is at least 1:4.

US 2009/0018249 discloses a hydrophobic self-cleaning coating composition. The coating composition may include a hydrophobic fumed silica ranging in size from 1000 to 4,000 nanometers in an effective amount of up to 5.0 percent by weight based on the total weight of the composition and a solvent or solvent mixture. The coating composition results in a coated surface providing a contact angle of at least 165 degrees as compared to water having a contact angle of from 10 to 15 degrees on a noncoated surface.

U.S. Pat. No. 8,354,160 discloses a method of forming a very hydrophobic, extremely hydrophobic or superhydrophobic surface. The method may include depositing a composition including hydrophobic microparticles, hydrophobic nanoparticles, or a mixture thereof and a binder in sufficient quantity to provide a hydrophobic or a superhydrophobic surface on a substrate having a micropatterned surface having raised portions, recessed portions, or a combination thereof.

BRIEF SUMMARY

We hereby disclose a coating composition comprising porous aluminum silicate particles of certain particle sizes and pore diameters which, additionally, are hydrophobized with hydrophobic organic molecules or polymers, and at least one hydrophobic polymeric binder.

In some embodiments, the coating composition includes hydrophobized porous aluminum silicate particles; a film-forming hydrophobic binder; and a solvent. The hydrophobized porous aluminum silicate particles comprise aluminum silicate particles having a pore diameter of about 50 Å or more and modified with hydrophobic organic molecules or polymers on a surface of the porous aluminum silicate particles.

Another example of the present invention is an article. The article may include at least one difficult-to-wet surface which is composed essentially of the coating composition according to one embodiment of the present invention.

DETAILED DESCRIPTION

The present disclosure will be described in further detail with reference to the accompanying embodiments in order to provide a better understanding by those skilled in the art of the technical solutions of the present disclosure.

The following terms, used in the present description and the appended claims, have the following definition.

A numerical range modified by "about" herein means that the upper and lower limits of the numerical range can vary by 10% thereof. A numerical value modified by "about" herein means that the numerical value can vary by 10% thereof.

The term "hydrophobized" is used herein to indicate aluminum silicate particles are modified with hydrophobic molecules or polymers that includes long chain hydrocarbon, perfluorocarbon or siloxane groups.

The term "hydrophobic" refers to a surface, a film, or a coating that is difficult to wet with water. A surface would be considered hydrophobic if it demonstrated a static water contact angle of at least 90°, very hydrophobic if it demonstrated a static water contact angle of at least 110°. The term "superhydrophobic" refers to a surface, a film, or a coating that is extremely difficult to wet with water. A superhydrophobic surface or coating will usually have static water contact angles in excess of 130°, and often in excess of 140°.

The term "porous" refers that particles have a nitrogen pore volume (BJH method, see Barrett et al, *J. Am. Chem. Soc.,* 73, 373-380, 1951) of at least 1 cc/g.

The term "pore diameter" (PD) is defined as PD (Å)=40,000*PV/SA based on a cylindrical model, wherein PV represents nitrogen pore volume in cc/g of the particles, and SA represents a BET surface area (see Brunauer et al, *J. Am. Chem. Soc.,* 60, 309-319, 1938) in $m^2/g$ of the particles.

Some embodiments of the present invention accordingly provide a composition, especially in the form of a coating composition, for producing difficult-to-wet surfaces, comprising i) hydrophobized porous aluminum silicate particles, ii) a hydrophobic film-forming binder, and iii) a solvent. In one embodiment, the hydrophobized aluminum silicate particles comprise aluminum silicate particles and a hydrophobic coating on a surface of the aluminum silicate particles. The aluminum silicate particles have a pore diameter of about 50 Å or more, preferably about 60 Å or more, more preferably about 70 Å or more. In one embodiment, the pore diameter ranges from about 50 Å to about 1000 Å, preferably from about 55 Å to about 500 Å. A weight ratio of hydrophobized aluminum silicate particles to the film-forming binder is at least 30%, preferably at least 40%. In one embodiment, the solvent includes one or more organic solvents or water.

The aluminum silicate particles are porous particles with amorphous nature. The term "amorphous" herein means that a material or materials in solid forms are non-crystalline or lack the long-range order that is characteristic of a crystal. Typically in X-ray diffraction, amorphous solids will scatter X-rays in many directions leading to large bumps distributed in a wide range instead of high intensity narrower peaks for crystalline solids. Amorphous aluminum silicates, also known as aluminosilicates, useful in some embodiments of the present invention are chemical compounds that are derived from aluminum oxide ($Al_2O_3$) and silicon dioxide ($SiO_2$). The amorphous aluminum silicate may be an amorphous alkali metal/alkaline earth metal aluminum silicate which additionally contains alkali metal and alkaline earth metal. The alkali metal may be selected from the group consisting of lithium, sodium, potassium, rubidium, cesium, francium and mixtures thereof. In one embodiment, the alkali metal is sodium. The amorphous alkali metal/alkaline earth metal aluminum silicate may also contain at least an alkaline earth metal selected from the group consisting of beryllium, magnesium, calcium, strontium, barium, radium and mixtures thereof. In one embodiment, the alkaline earth metal is magnesium.

The aluminum silicate particles present in the compositions according to some embodiments of the present invention may have particular particle sizes, which are measured by light scattering methods. The powder particles present in the coating compositions according to some embodiments of the present invention preferably have a median particle size, D50, in a range of from about 0.5 µm to about 50 µm, with particular preference of from about 1 µm to about 15 µm. The D50 is the diameter at which 50% of a sample's mass is comprised of smaller particles.

The aluminum silicate particles present in the compositions according to some embodiments of the present invention are characterized substantially by their hydrophobic surface and their porous structure, which is manifested in a high specific surface area. The specific surface area is the BET surface area determined in accordance with DIN 66131. The aluminum silicate particles present in the coating compositions of the present invention preferably have a BET surface area in the region of at least 5 $m^2/g$, in particular at least 10 $m^2/g$, and with particular preference at least 20 $m^2/g$. In particular, the BET surface area of the hydrophobic particles is in the range from 5 to 500 $m^2/g$, with particular preference in the range from 10 to 400 $m^2/g$, and with very particular preference in the range from 20 to 350 $m^2/g$.

In a preferred embodiment, the amorphous alkali metal/alkaline earth metal aluminum silicate is amorphous sodium aluminum silicate. The preparations of these particles are known in the art. For example, EP0701534 taught a process for the production of aluminum silicates and in particular aluminum silicates having a high surface area and alumina content.

In one embodiment, the aluminum silicate particles are modified with hydrophobic molecules or polymers on the surface of the particles to form the hydrophobized aluminum silicate particles. The hydrophobic molecules or/polymers may be physically coated or chemically modified to the surface of aluminum silicate particles. Preferably, the hydrophobic molecules or polymers are covalently modified onto the surfaces of the particles.

The hydrophobic molecules or polymers may comprise nonpolar organic molecules. Examples of the hydrophobic molecules or polymers include but not limited to waxes, silanes and siloxane polymers. In one embodiment, the hydrophobic molecules include silanes having a large number of alkyl groups ($-CH_2-$) or (per)fluoroalkyl groups ($-CF_2-$). The alkyl or per(fluoroalkyl) groups may include at least 4 carbon atoms. In one embodiment, the hydrophobic polymers are siloxane polymers including polydialkylsiloxane groups ($-OSi(R_2)-$), such as polydimethylsiloxane groups ($-OSi(Me)_2-$), which may be linked with the aluminum silicate particles, for example, by covalent bonds.

Aluminum silicate particles according to some embodiments of the present invention are generally obtained by treating the aluminum silicate particles with alkylsilanes, perfluoroalkylsilanes, and/or siloxane polymers that can undergo chemical reaction with the surface silanol groups of the oxide support particle. The alkylsilanes or (perfluoro)alkylsilanes may have molecular weights of at least 200. The polydialkylsiloxanes may have molecular weights of at least 800. Examples of the hydrophobic silane or siloxane include octadecyl trimethoxysilane, octadecyl trichlorosilane, perfluorooctyltrimethoxysilane, polydimethoxysilane, or silanol terminated polydimethylsiloxane.

The hydrophobized aluminum silicate particles may be prepared by a solution modification process, a dry modification process, or a milling and modification process. In one embodiment, hydrophobized aluminum silicate particles are prepared by a solution modification process involving the mixing of the particles with a solution of hydrophobic silanes and/or siloxanes in an organic solvent or a mixture of organic solvents. The mixture is thereafter blended with stirring for a time and at a temperature sufficient to allow reaction between surface silanol groups on the aluminum silicate particles and functional groups on the hydrophobic silanes and siloxanes. Preferably, the mixture is blended for about 5 to about 20 hours, with most preference of at least 8 hours, and a temperature ranging from ambient to about 120° C.

In another embodiment, the hydrophobized aluminum silicate particles may be prepared by a dry modification process, which involves a continuous mixing of the particles with liquid silanes and siloxanes without the presence of a solvent. The mixing is preferably performed for a time and at a temperature sufficient to accomplish the reaction between surface silanol groups on the aluminum silicate particles and the functional groups on the hydrophobic silanes and siloxanes, e.g. for about 5 to about 20 hours, at a temperature ranging from ambient to about 120° C. Preferably, the dry bonded mixture is heated at a high temperature, for example, 120° C., for about 5 to about 15 hours.

In yet another embodiment, the hydrophobized aluminum silicate particles are prepared by a continuous mixing and milling process, preferably, using a spiral jet mill process. The aluminum silicate particles are milled and modified with the hydrophobic silanes or siloxane polymers to obtain the hydrophobized aluminum silicate particles having a median particle size from about 0.5 µm to about 50 µm. In a preferred embodiment, the hydrophobized aluminum silicate particles may have a median particle size ranging from about 1 µm to about 15 µm.

The film-forming binders useful in the present invention may vary depending on the desired end use. The film-forming binders are typically organic polymers or other hydrophobic organic substances such as waxes which may form a solid film on a surface. The film-forming binders serve, for example, to fix the powder particles on the surface of the substrate to be coated or to fix the powder surfaces to one another when the compositions are used as powders or to produce a shaped article. The film formed by the binder may be sufficiently hydrophobic (water contact angle of at least 80°). However, for coated film with good durability, the types of polymers or other organic substrates are important. In some embodiments, the polymers or organic substances are capable of crosslinking in the presence of some crosslinking agents, and after the crosslinking, the coated films can become very durable.

The hydrophobicity of the binder is characterized using its surface tension. This may be determined, for example, by measuring the static contact angle of water on a smooth surface coated with the binder. Hydrophobic binders feature static contact angles for water of at least 80°.

In one embodiment, the film-forming binder is characterized by a surface tension <50 mN/m and which is selected from the group consisting of $C_2$-$C_6$ polyolefins, homopolymers of ethylenically unsaturated monomers containing $C_8$-$C_{36}$ alkyl groups, and copolymers of ethylenically unsaturated monomers containing C4-C36 alkyl groups, C1 to C36 alkyl vinyl ethers, vinyl esters of $C_1$ to $C_{36}$ carboxylic acids, and ethylenically unsaturated comonomers copolymerizable therewith, natural waxes, and synthetic waxes.

The binders may comprise thermoplastic polymers which are soluble in organic solvents. Alternatively, the binders, in small particle size format (with a particle size of between 50 nm to 1 µm range), can also be dispersed in water or other solvents with or without ionic or non-ionic surfactants. The binders used may also comprise organic prepolymers which are crosslinked by a thermal, oxidative or photochemical curing process and so form a solid coating with the particles.

Furthermore, binders may be fatty acids having more than 8 carbon atoms, especially ethylenically unsaturated fatty acids, and their esters with polyfunctional alcohols such as glycerol, ethylene glycol, propanediol, sorbitol, glucose, sucrose or trimethylolpropane, the fatty acids and their esters curing oxidatively and so being included in the class of the prepolymers. Also suitable as binders are natural waxes such as paraffin wax, beeswax, carnauba wax, wool wax, candelilla wax, and also synthetic waxes such as montanic acid waxes, montanic ester waxes, amide waxes, e.g., distearoylethylenediamine, Fischer-Tropsch waxes, and also wax like polymers of ethylene and of propylene (polyethylene wax, polypropylene wax). As discussed above, these waxes can be wax particles dispersed in water with certain surfactants.

The film-forming binder may be formed from hydrophobic monomers, which are selected from C2-C24 olefins, C5-C8 cycloolefins, fluoroolefins, fluorochloroolefins, vinyl aromatics, diolefins such as butadiene, isoprene and chlorobutadiene, and different monoethylenically unsaturated monomers containing at least one C2-C36 alkyl group, etc.

Examples of preferred hydrophobic monomers are C2-C24 olefins, such as ethylene, propylene, n-butene, isobutene, n-hexene, n-octene, isooctene, n-decene, isotridecene, C5-C8 cycloolefins such as cyclopentene, cyclopentadiene, cyclooctene, vinyl aromatic monomers, such as styrene and α-methylstyrene, and also fluoroolefins and fluorochloroolefins such as vinylidene fluoride, chlorotrifluoroethylene, tetrafluoroethylene, vinyl esters of linear or branched alkane carboxylic acids having 2 to 36 carbon atoms, e.g., vinyl acetate, vinyl propionate, vinyl n-butyrate, vinyl isobutyrate, vinyl hexanoate, vinyl octanoate, vinyl laurate and vinyl stearate, and also esters of acrylic acid and of methacrylic acid with linear or branched C2-C36 alkanols, e.g., ethyl (meth)acrylate, n-butyl (meth)acrylate, tert-butyl (meth)acrylate, n-hexyl (meth)acrylate, 2-ethylhexyl (meth)acrylate, 2-propylheptyl (meth)acrylate, lauryl (meth)acrylate and stearyl (meth)acrylate and also vinyl ethers and allyl ethers of C2-C36 alkanols, such as n-butyl vinyl ether and octadecyl vinyl ether, fluorinated monomers.

The film-forming binders may include polyethylene, polypropylene, polyisobutene, polychlorotrifluoroethylene, polytetrafluoroethylene, polyvinyl acetate, polyethyl methacrylate, poly-n-butyl methacrylate, polyisobutyl methacrylate, poly-tert-butyl methacrylate, polyhexyl methacrylate, poly(2-ethylhexyl methacrylate), polyethyl acrylate, poly-n-butyl acrylate, polyisobutyl acrylate, poly-tert-butyl acrylate, poly(2-ethylhexyl acrylate), and copolymers of maleic acid with at least one hydrophobic monomer selected from C3-C6 olefins, C1-C36 alkyl vinyl ethers, and the vinyl esters of aliphatic C1-C36 carboxylic acids.

Further suitable film-forming binders are poly-C1-C4-alkylene oxides, such as polyoxymethylene, polypropylene oxide and polybutylene oxide, polytetrahydrofuran and also polycaprolactone, polycarbonates, polyvinylbutyral, polyvinylformal, and also linear or branched polydialkylsiloxanes such as polydimethylsiloxane (silicones). The silicones can be crosslinked with tetraethyl orthosilicate with a tin complex compound as catalyst.

Further suitable film-forming binders include partly aromatic polyesters made from aliphatic or aromatic dicarboxylic acids and aliphatic and/or aromatic diols, e.g.: polyesters synthesized from aliphatic dialcohols having 2 to 18 carbon atoms, e.g., propanediol, butanediol, hexanediol, and dicarboxylic acids having 3 to 18 carbon atoms, such as adipic acid and decanedicarboxylic acid; polyesters synthesized from bisphenol A and the above mentioned dicarboxylic acids having 3 to 18 carbon atoms; and polyesters synthesized from terephthalic acid, aliphatic dialcohols having 2 to 18 carbon atoms, and dicarboxylic acids having from 3 to 18 carbon atoms.

The polyesters may optionally be terminated by long-chain monoalcohols having 4 to 24 carbon atoms, such as 2-ethyl hexanol or octadecanol. Furthermore, the polyesters may be terminated by long-chain monocarboxylic acids having 4 to 24 carbon atoms, such as stearic acid.

The weight-average molecular weight of the film-forming binder polymers may vary over a wide range and is generally in the range from 1000 to 10 million g/mol and preferably in the range from 2500 to 6 million, in particular 2500 to 5 million, g/mol (determined by viscometry). Where the binder polymer is a polyolefin, and especially polyisobutene, its weight-average molecular weight is preferably in the range from 30,000 to 6 million g/mol, or in the range from 500,000 to 5 million g/mol. In the case of polyoctadecyl vinyl ether, the molecular weight is preferably in the range from 2000 to 10,000 g/mol and in particular in the range from 2500 to 5000 g/mol.

In some embodiments, the film-forming binders are photochemically and/or thermally crosslinkable binders, which are polymers and oligomers having ethylenically unsaturated double bonds, as used to prepare radiation-curable coating materials. These binders include, for example, flowable formulations of polyether acrylates, polyester arylates, polyurethane acrylates, polyesters with condensed maleic anhydride units, epoxy resins, e.g., aromatic epoxy resins, the oligomers and/or polymers being present, if desired, in solution in organic solvents and/or reactive diluents in order to improve their flowability. Reactive diluents include low molecular mass, ethylenically unsaturated liquids which on crosslinking form the coating together with the ethylenically unsaturated polymers.

Bisphenol based epoxy resin systems can also be used as the film-forming binder. These resins can be crosslinked and cured with amines and diamines, and particularly, the amines and diamines can consist of long hydrocarbon chains (>6) to make the cured epoxy surface hydrophobic.

Radiation-curable binders, and formulations comprising these binders, are well known to the skilled worker, e.g., from P. K. T. Oldring (Ed.) "Chemistry and Technology of UV & EB Formulation for Coatings, Inks & Paints", Vol. 2, 1991, Sita Technology London, and available commercially, for example, under the commercial brands Laromer® P084F, Laromer® LR8819, Laromer® PE55F, Laromer® LR8861, BASF Aktiengesellschaft, Ludwigshafen.

Binders in accordance with some embodiments of the present invention are C2-C6 polyolefins, especially polyisobutene, atactic, isotactic, and syndiotactic polypropylene, polyethylene, and also homopolymers and copolymers of ethylenically unsaturated monomers containing C4-C36 alkyl groups, especially containing C8-C22 alkyl groups, and, if desired, ethylenically unsaturated comonomers copolymerizable therewith, and also C3-C4 polyalkylene oxides. Of these, particular preference is given to homopolymers and copolymers of C8-C36 alkyl vinyl ethers, e.g., polyoctadecyl vinyl ether.

In one embodiment, the film-forming binder comprises a fluorine-containing polymer and the solvent comprises one or more organic solvents. The fluorine-containing polymer may be polytetrafluoroethylene, polyhexafluoropropene, tetrafluoroethylene hexafluoropropene copolymer, alkoxy fluoroethylene copolymer, ethylene-tetrafluoroethylene copolymer, or a combination thereof.

In one embodiment, the coating composition further includes a cross-linker for crosslinking the film-forming binder. In one embodiment, the coating composition further includes an initiator and the cross-linker comprises two or more carbon-carbon double bonds. In one embodiment, the film-forming binder further comprises a gelation agent.

In one embodiment, the film-forming binder comprises an aqueous wax emulsion or an aqueous emulsion of the hydrophobic polymer and the solvent comprises water. In one embodiment, the coating composition is prepared by dispersing the hydrophobized aluminum silicate particles in water in a presence of a surfactant to form a suspension of the hydrophobized aluminum silicate particles, and then mixing the wax emulsion or the emulsion of the hydrophobic polymer with the suspension of the hydrophobized aluminum silicate particles. In one embodiment, the film-forming binder is present in an amount of about 1% to about 30% by weight of the coating composition.

In order to achieve the low wettability effect desired in accordance with some embodiment of the present invention, the weight ratio of hydrophobic aluminum silicate particles i) to binder ii) in the compositions may be at least 30%, preferably at least 35%, and with particular preference at least 40, with very particular preference at least 50%. This weight ratio will preferably not exceed a value of 75%, in particular 80%. With very particular preference, the weight ratio of i) to ii) is in the range from 40% to 60%.

The coating compositions according to some embodiments of the present invention may be used in a dry form, i.e., as a powder formulation comprising both the finely divided hydrophobic particles i) and the hydrophobic polymeric binder ii).

In one embodiment, the coating composition is employed in a form which is fluid at the processing temperature. The coating compositions may of course be processed both at room temperature and at temperatures above or below room temperature, for example, at temperatures in the range from 0° C. to 150° C., depending on the nature of the formulation.

In the fluid form, the coating compositions of some embodiments of the present invention generally comprise not only the powder i) and the binder (ii) but also, if desired, a diluent or solvent, preference being given to those solvents which dissolve the polymeric binder but not the finely divided powder i). Alternatively, the binders can also be homogeneously dispersed in the solvents or water with help of a surfactant or surfactants. This improves the formation of the coating.

Suitable solvents are volatile organic solvents or water which evaporate following the application of the coating, with or without heating, thereby permitting the formation of a uniform film of the binder polymer. Examples of suitable solvents are ketones, such as acetone and ethyl methyl ketone, volatile esters of acetic acid, such as ethyl acetate and n-butyl acetate, cyclic ethers, such as tetrahydrofuran, and also aliphatic and aromatic hydrocarbons, such as turpentine oil, petroleum, petroleum spirit, toluene, and xylene. Polar solvents can also be used. For example, hydrophobic thermoplastic polyurethanes can only be dissolved in dimethylformamide (DMF), and in this case, DMF can be used in the formulation.

In the liquid formulations, the solids content (total amount of particles i) and polymer binder ii), based on the overall weight of the formulation) is in the range from 0.5 to 80% by weight. In the coating compositions, the solids content may be frequently in the range from 10 to 50% by weight.

In the case of sprayable coating materials, it may also be below this level, e.g., in the range from 0.5 to 10% by weight.

Another example of the present invention is a hydrophobic film formed from the coating composition according to one embodiment of the present invention, wherein the hydrophobic film exhibits a static contact angle for deionized water at room temperature equal to or greater than about 140° and a rolling rating of at least 1 in a scale of 0-3. In one embodiment, the hydrophobic film is produced by a method selected from the group consisting of spin coating, dip coating, spray coating, roller coating, drawdown, brush coating, and a mixture thereof.

To produce the difficult-to-wet surface, the coating compositions according to some embodiments of the present invention are applied conventionally to the substrates that are to be coated. In principle, all conventional surfaces may be coated with the coating compositions of the present invention. Examples of conventional surfaces are the surfaces of wood, metal, glass and plastic. The coating compositions of the present invention may of course also be used to coat rough and/or porous surfaces, such as concrete, plaster, paper, woven fabric, examples including textile woven fabric for clothing, umbrellas, tents, and marquees, and for comparable applications, and also leather and hair as well.

The application of the coating to the surface that is to be coated (also referred to as the substrate herein below) is made, depending on the embodiment of the coating composition and on the nature of the substrate, in accordance with the application techniques customary in coatings technology. In the case of flowable coating compositions containing solvent, application is made generally by brushing, spraying, e.g., by means of airbrush, dipping or rolling, with subsequent drying of the coating, during which the solvent evaporates.

If the binder ii) used is a thermally, oxidatively or photochemically crosslinkable prepolymer, then the coating compositions are in many cases flowable even without adding solvents and may be applied by the abovementioned technique, possibly following dilution with a reactive diluent. In this case, the actual coating is formed by thermal, oxidative or photochemical curing (crosslinking) of the prepolymers. One particular example is epoxy prepolymer and the curing of the epoxy polymer.

In order to achieve the desired effect, the coating composition will be applied preferably in an amount of at least 0.01 g/m$^2$, in particular at least 0.1 g/m$^2$, and especially at least 0.5 g/m$^2$ and preferably not more than 1000 g/m$^2$, based on the solid constituents of the coating composition, to the surface that is to be coated. Solid constituents in this context are essentially the components i) and ii). This corresponds to a real weight of the coating, following the evaporation of volatile constituents, of at least 0.01 g/m$^2$, in particular at least 0.1 g/m$^2$, and especially at least 0.5 g/m$^2$. In many cases, the coatings are applied in amounts of up to 100 g/m$^2$ to the surface that is to be coated (based on solid constituents), although in other forms of application, larger amounts of coating composition will be applied, for example, in the case of coatings in the form of masonry paints, or in the context of the coating of concrete roofing slabs.

Another embodiment according to some embodiments of the present invention relates to the use of the compositions for producing shaped articles having difficult-to-wet surfaces. In one embodiment, the article includes at least one difficult-to-wet surface which is composed essentially of a coating composition according to one embodiment of the present invention. The difficult-to-wet surface may exhibit a static contact angle for deionized water at room temperature equal to or greater than about 140° and a rolling rating of at least 1 in a scale of 0-3. The article may be made of at least a material selected from the group consisting of glass, metal, plastics, wood, concrete, fabrics, cellulosic materials, and paper.

The same advantageous properties as the surfaces coated in accordance with the present invention are also possessed by the shaped articles produced from the compositions of the present invention. Furthermore, the shaped articles surprisingly do not lose these properties even when their surface is destroyed, by roughening or scratching, for example. This property makes it possible to regenerate the advantageous surface properties if the surfaces age.

Moreover, the flow resistance of liquids, especially water and aqueous solutions, is reduced when they flow through pipes, capillaries or nozzles which have been coated with the coatings according to some embodiments of the present invention. On the basis of their properties, the compositions of the present invention can be put to a great diversity of uses.

Materials susceptible to corrosion, such as concrete, including steel-reinforced concrete, wood or metal may be effectively protected against corrosion by coating with the coating compositions of the present invention. The compositions according to some embodiments of the present invention are suitable, moreover, for the surface finishing of paper, card, or polymer films.

Fabrics, especially textile fabrics, which have been provided with the compositions according to some embodiments of the present invention are notable for a high level of imperviousness to water and a low level of water absorption, and repel dirt. By treatment with the compositions according to some embodiments of the present invention, the fabric becomes downright water-repellent. Particles of dirt can easily be rinsed off with water without any significant absorption of water. The compositions according to some embodiments of the present invention are suitable, accordingly, as a water- and dirt-repellent finish for fabric which can be used, for example, to produce clothing, tents, marquees, tarpaulins, umbrellas, to line compartments, e.g., motor vehicle interiors, to line seating areas, in the automotive sector, for example.

Leather which has been treated with the compositions according to some embodiments of the present invention is suitable for producing leather clothing and shoes having water- and dirt-repellent properties. In the field of cosmetology, the compositions according to some embodiments of the present invention may be used as hair treatment compositions, e.g., in the form of hairsprays, provided they comprise a cosmetically compatible binder i), e.g., the polymers commonly employed for this purpose. Components and shaped articles can be used in a similar fashion.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Hereinafter, the present invention will be described in more detail with reference to Examples. However, the scope of the present invention is not limited to the following Examples.

EXAMPLES

Materials

Table 1 lists the properties of the particles used in the Examples such as median particle size (PS) D50, BET surface area (BET), pore volume (PV) and calculated pore diameter (PD). The particle sizes were determined by a light scattering method using a Malvern Mastersizer 2000 or 3000 available from Malvern Instruments Ltd. per ASTM B822-10. A median particle size D50 was reported. The "BET surface area" of the particles was measured by the Brunauer Emmet Teller nitrogen adsorption method (Brunauer et al, *J. Am. Chem. Soc.,* 1938, 60(2), 309-319), and nitrogen pore volume refers to the average pore volume of a plurality of particles determined using the Barrett-Joyner-Halenda (BJH) nitrogen porosity as described in DIN 66134. The carbon content of the particles is measured using a LECO Carbon Analyzer SC-632 available from LECO Corp.

TABLE 1

Physical Properties of Sample Particles

| Particle Identification | Material | MgO % | PS D50 (μm) | BET (m²/g) | PV (cc/g) | PD (Å) |
|---|---|---|---|---|---|---|
| P-1 | Amorphous sodium magnesium aluminum silicate | 2 | 2.7 | 60 | 0.4 | 266 |
| P-2 | Amorphous sodium magnesium aluminum silicate | 2 | 5.5 | 60 | 0.4 | 266 |
| P-3 | Amorphous sodium aluminum silicate | 0 | 3.1 | 272 | 0.21 | 30 |
| P-4 | Amorphous sodium aluminum silicate | 0 | 2.6 | 132 | 0.13 | 40 |
| P-5 | Amorphous sodium magnesium aluminum silicate | 5 | 1.2 | 124 | 0.31 | 101 |
| P-6 | Amorphous sodium aluminum silicate | 0 | 5.2 | 93 | 0.36 | 153 |
| P-7 | Amorphous sodium aluminum silicate | 0 | 5.0 | 66 | 0.26 | 161 |
| P-8 | Amorphous sodium aluminum silicate | 0 | 5.0 | 67 | 0.32 | 193 |
| P-9 | Amorphous sodium aluminum silicate | 0 | 5.0 | 42 | 0.14 | 135 |
| P-10 | Amorphous sodium magnesium aluminum silicate | 2 | 0.9 | 85 | 0.31 | 148 |

In Table 1, P-1, P-2, P-5, and P-10 are precipitated amorphous sodium magnesium aluminum silicate particles. P-3, P-4, P-6 to P-9 are precipitated amorphous sodium aluminum silicate particles. The general preparation methods of these particles are described as follows.

Typically, the preparation method as described in EP0701534 was followed with some modifications. The precipitated amorphous aluminum silicates were prepared by adding solution of aluminum sulfate, with strong stirring, to solution of sodium silicate solution while maintaining the pH constant. The solutions might be optionally heated. Optionally, different amount of magnesium chloride solution was mixed with aluminum sulfate. The typical reaction time was between 1 and 2 hours. After the addition was completed, the precipitated particles were filtered and washed with DI water 5 times, and then they were dried at 120° C. overnight and milled to desired particle size utilizing fluid energy mill or jet mill or small scale analytical mill. The following Table 2 lists the reaction conditions for the preparation of P-1 to P-10.

TABLE 2

Preparation of Aluminum Silicates

| Particle ID | Reaction pH | Reaction Temperature (° C.) | MgCl₂ Used? | Reaction Time (minutes) |
|---|---|---|---|---|
| P-1 | 8.9 | 84 | Yes | 74 |
| P-2 | 8.9 | 84 | Yes | 74 |
| P-3 | 7.5 | 20 | No | 90 |
| P-4 | 6.5 | 20 | No | 90 |
| P-5 | 8.9 | 84 | Yes | 74 |
| P-6 | 8.9 | 84 | No | 74 |
| P-7 | 8.9 | 84 | No | 74 |
| P-8 | 8.9 | 84 | No | 74 |
| P-9 | 8.9 | 84 | No | 74 |
| P-10 | 8.9 | 84 | Yes | 74 |

Table 3 lists hydrophobizing agents used in the following Examples and Comparative Examples. In the following Examples, silicone oil and polydimethylsiloxane or PDMS are used interchangeably.

TABLE 3

Hydrophobizing Agents Used in Modification of Aluminum Silicates

| Identification | Chemical Name | Trade Name | Supplier | Molecular Weight (Dalton) |
|---|---|---|---|---|
| PDMS | Silanol terminated polydimethylsiloxane | CRTV944 | Momentive | ~15000 |
| C18 Silane | Octadecyltrimethoxysilane | Trimethoxy(octadechyl)silane | Gelest, Inc. | 375 |
| F13 Silane | Triethoxy(3,3,4,4,5,5,6,6,7,7,8,8-tridecafluoro-1-octyl) silane | 1H,1H,2H,2H-Perfluorooctyltriethoxysilane | Sigma-Aldrich | 510 |

Modification Procedures for Hydrophobized Particles

Solution Modifications:

A 100 ml Nalgene® bottle was charged with 2 g of oven dried particles (particles in Table 1), 0.2 g of silane (C18 or F13 silanes), and 40 ml of anhydrous toluene. The cap of the bottle was closed tightly. The materials inside the bottle were then mixed on a mechanical rotator, a Roto-Torque model 7637 from Cole-Parmer for at least 10 hours.

Dry Modifications:

Both a 500 mL round bottom flask and the starting particles were oven dried, for example, at 120° C. for about 12 hours. In the flask was charged with the oven-dried starting particles. Then, 5 to 55 wt % of PDMS were added into the flask dropwise using a pipette dropwise while the flask was frequently shaken so that the starting particles and the PDMS were mixed as homogeneously as possible. If the silicone oil was too viscous, a small amount of toluene was used to dissolve the PDMS, and then the dissolved PDMS was added. The mixture of the PDMS and the particles were allowed to roll on a rotavap at room temperature for about 5 hours to about 12 hours. Then, the mixture of the PDMS and the particles was transferred into a crystalline dish, which was then placed in a fume hood for a few hours to allow toluene, if used, to evaporate. Finally, the crystalline dish containing the mixture of the PDMS and the particles were placed in an oven and baked at 120° C. for about 12 hours.

Milling and Modifications:

A 10" spiral jet mill with eight 0.011" grind holes was used. The grinding chamber of the spiral jet mill was modified so that a 0.8 mm nozzle could be inserted from outside to inside of the grinding ring wall. This nozzle was connected to a metering pump which was used to meter in the PDMS.

Specifically, the bonding procedure includes the following steps. First, the mill superheater was brought up to a temperature, for example, in a range from 300 F to 340 F. An Acrison Loss-in-weight feeder was filled with the particles to be milled. The feeder was set to a constant rate of 40 lb/hr of particles. During the bonding, the temperature of the mill superheater was constantly being adjusted by a control system to keep the mill outlet temperature between 300-340F, and the mill grinding pressure and injection pressure were controlled at 18 and 80 psi, respectively. Then, a pre-calibrated metering pump was turned on to inject PDMS through the nozzle into the milling chamber. As such, the particles and PDMS were being added to the mill at the same time. This process continued until a desired amount of milled-hydrophobic product was produced.

Preparation of Coating Compositions

The hydrophobized particles were mixed separately with eight different types of film-forming binder systems in solvents to create the coating compositions, as described in detail below:

Binder System 1:

A fluorine containing polymer, fluoro-elasomer DAI-EL® G802 from Daikin America, Inc. (Orangeburg, NY)), was used as the film-forming binder. G802 is a peroxide curable copolymer with about 66% fluorine content and has a specific gravity of 1.81. The 10 w/w % solution in acetone was prepared by heating and stirring the polymer in acetone for about 2 hours, and the solution was used as stock solution.

Some pre-determined amounts of the hydrophobized particles were mixed with the above solution. Toluene or acetone was added to make the mixture at desired ratios and concentrations. The mixture was sonicated in a sonic batch for 1 hour. Then, the mixture was used to create coated film on the substrates.

To improve durability of the coated film, a cross-linker was used in some examples. Specifically, about 4% of triallyl isocyanurate and 3% of dicumyl peroxide (weight percentage to the weight of the G802 polymer used) were dissolved in the coating composition right before the coating was applied. Thermal treatment of the coated film at 120° C. for 1 hour enabled the crosslinking reaction to happen among binder molecules in the coated film.

Binder System 2:

A hydrophobic polyurethane was used as the film-forming binder. IROGRAN® A 85 P 4394 is a polyether-based, hydrophobic thermoplastic polyurethane (TPU). This product is manufactured by Huntsman Corporation (Woodlands, TX). The 2.9 w/w % stock solution in dimethylformamide (DMF) was prepared by dissolving the right amount of polymer in DMF with sonication in a sonic bath for 1 hour, and this solution was used as stock solution.

Some pre-determined amounts of the hydrophobized particles were added into the above solution to make the mixture at the desired ratios. The mixture was sonicated in a sonic batch for 1 hour. Then, the mixture was used to create coated film on the substrates.

After coating, thermal treatment of the coated film at 120° C. for 4 hours enabled a layer of coated film with homogeneously distributed particles in the TPU.

Binder System 3:

Wax emulsions were used as the film-forming binders. API-WP30C was obtained from Advanced Polymer, Inc. (Carlstadt, NJ). API-WP30C is an aqueous paraffin wax emulsion stabilized by anionic surfactants. AW-703 was obtained from A & W Products, Inc. (Bishop, GA), and it is an aqueous polyethylene wax co-emulsion stabilized also by anionic surfactants. Both emulsions can be used to create coated films on porous substrates such as wood or concrete.

To obtain a good mixing of the wax emulsion particles and the hydrophobized particles in water, the hydrophobized particles needed to be dispersed in water first. Towards this end, 10 grams of the hydrophobized particles were mixed with about 0.42 grams (4.2 wt %) of Triton X-100 (Dow Chemical Company) in 190 g of water with high shear mixing (Silverson mixer at about 6000 rpm) for about 30 minutes. Then, the dispersed particles in water could be mixed with wax emulsions, followed by diluting with water to make the formulation with desired concentrations prior to the coating steps.

Binder System 4:

Polymer emulsions were used as the film-forming binders. Specifically, a polyolefin (PO) emulsion CANVERA™ 1110 was obtained from Dow Chemical Company (Midland, MI). It is an aqueous acid-modified polyolefin dispersion.

To obtain a good mixing of the PO emulsion particles and the hydrophobized particles in water, the hydrophobized particles needed to be dispersed in water first. Towards this end, 10 grams of the hydrophobized particles were mixed with about 0.42 grams (4.2 wt %) of Triton X-100 (Dow Chemical Company) in 190 grams of water with high shear mixing (Silverson mixer at about 6000 rpm) for about 30 minutes. Then, the dispersed particles in water were mixed with wax emulsions to make the desired concentrations prior to the coating steps.

Binder System 5:

The film forming binders could also be formed with polymerization or gelation in situ after coating, and this is especially true for rubbery type of materials. Specifically, silanol terminated PDMS, CRTV942 (Viscosity 4000 cP, available from Momentive Company (Waterford, NY)), 5 wt % (to the weight of PDMS) of tetraethyl orthosilicate (TEOS), and 2.5 wt % (to the weight of PDMS) of Dibutyltin dilaurate (DBTDL) were mixed in toluene, and some desired amounts of hydrophobized particles were then added. The mixture was let to sit for 10 hours, and then was sonicated in a sonic batch for 30 minutes, and this was followed by a coating procedure to form a coated silicone rubber film.

Binder System 6:

The film forming binders could also be formed from polymerization and crosslinking in situ and in the presence of a radical polymerization initiator after coating. Specifically, in a 20 ml of glass vial, 0.5 g of pentaerythritol tetraacrylate, 3 g of polyester acrylate 03-849 (33% solution in acetone) (from Rahn, USA Corp. Aurora, IL), 0.5 g of CN4002 (Sartomer USA, Exton, PA), 1.4 g of hydrophobisized particles, and 3 g of acetone were mixed together and sonicated in a sonic bath for 1 hour. Then the mixture was cooled to 5° C. in an ice batch. Then, 0.3 g of azobisisobutyronitrile (AIBN) initiator was added. The formulation was applied to glass or metal surfaces by spray. After coating, the substrate was dry in an oven at 100° C. for 3 hours under nitrogen.

Binder System 7:

The film forming binders could also be formed from formulating in hydrophobic acrylic resins. Specifically, in a 20 ml of glass vial, 0.05 g of octadecylamine was dissolved in 2 ml of acetone, and 1.06 g of AC2403 acrylic binder (from Alberdingk Boley, Inc., Greensboro, NC) was added. A precipitation was formed. To the mixture was added 2 ml of toluene and the mixture was vortexed and/or sonicated until solids were dissolved. The mixture was further diluted with 1 ml of acetone, and then 0.5 g of hydrophobic particles were added. The formulation was applied to glass or metal surfaces by spray. After coating, the substrate was dry in an oven at 150° C. for 2 hours.

Binder System 8:

The film forming binders could also be formed from an epoxy resin system with some hydrophobic modification of the resin. Specifically, in a 20 ml of glass vial, 0.7 g of octadecylamine was dissolved in 15 ml of acetone, and to the solution was added Epon 862 resin (Hexion Inc., Columbus, OH). The mixture was vortexed and sonicated. To the mixture, 0.65 g of EK3370 curing agent (also from Hexion) was added, and the formed formulation was applied to glass or metal surfaces by spray. After coating, the substrate was dry in an oven at 120° C. for 1 hours.

Coating Methods

Spin Coating

Spin coating is used for substrates with a flat surface. The substrates are non-porous substrates such as glass slides, aluminum, high-density polyethylene (HDPE), or porous substrates such as wood or concrete. Specifically, substrates were cut in 3 inch×3 inch in size to allow them to fit in the coater. A Ni-Lo 4 Spin Coater from Ni-L0 Scientific (Ottawa, Canada) with a built-in vacuum holder was used for the coating. Prior to coating, the substrates were cleaned with solvents or water and were then blown dry. For woods, sand paper might be used to flatten the surface before the coating steps.

The substrate was placed onto the coater with vacuum applied to hold the substrate on coater. Approximately 5-8 ml of the coating compositions from previous section were transferred onto the substrate with a pipette. Caution was taken to ensure that all the surface was covered with the coating composition. Then, the coating was carried out at 500 or 1000 rpm for 1 minute. After this step, the solvents were evaporated and then the coated substrates were placed in an oven at a temperature of 120° C. for 1 hour.

Drawdown

Drawdown was used for substrates having a large area of surfaces. The drawdown was carried out with a wire wound lab rod from Gardner Company with a wire size of 40. With this size, the wet film thickness was about 100 µm. The procedure for each drawdown was as follows:

a. In a dust free clean room, a flat substrate was placed on a vacuum holder.

b. About 5-10 ml of a well-mixed coating composition was positioned on and near the top of a sample sheet by a pipette.

c. The ends of the drawdown rod were immediately grasped. Using the thumbs of both hands to keep the rod from bowing or bending away from the sample, the drawdown rod was drawn down through the liquid pool, spreading and metering the fluid across the sample sheet. After a given drawdown was made, the drawdown rod was immersed in a cleaning tray after use.

d. After the drawdown, the samples were left at room temperature for solvent evaporation, and then the coated substrates were placed in an oven at a temperature of 120° C. for 1 hour.

Dip Coating

For flexible substrate such as fabrics (e.g., cloth) or paper, the whole piece of materials was immersed in the coating composition. Then, the substrates were taken out and solvents were allowed to evaporate. Then, the samples were placed in an oven at a temperature of 120° C. for 1 hour.

Spray Coating

The coating was applied onto substrates using a paint sprayer. A 2-piece HVLP Gravity Feed Air Spray Gut Kit with 0.8 mm nozzle from PowRyte (La Puente, CA) was used. The coating formulations were placed in the sample bottle and then the spray was applied under 30 psi air flow to various surfaces.

Evaluation of Coated Films on the Substrates

Rolling Ratings of the Coated Films

After coating and sometimes heat treatment for the coated layer, superhydrophobicity of the surfaces were evaluated using droplets of deionized water with a rolling rating range of 0, 1, 2 and 3.

0—water droplet sticks to the substrate;

1—water droplet only slides in some parts when inclined at 60°;

2—water droplet slides when inclined at 30°;

3—water droplet slides completely in all parts when inclined at 5°.

Static Water Contact Angles of the Coated Films:

A "pinning" method was used to place the droplets on the surface. Specifically, a droplet of the probe liquid (distilled water) was placed on the surface from a distance of 2.5 mm from a 22-gauge blunt-tipped needle. The droplet was held in contact with the sample surface for 4 seconds. The liquid was then slowly withdrawn from the surface until a freestanding droplet was formed. The droplet was then photographed immediately with a 36× digital camera. Typical droplet volume was 3 µL. At least six different droplets were photographed for each surface and each liquid. The droplet photos were then processed using ImageJ, a digital image processing software, and a contact angle measuring plugin. The angles were measured using best elliptical fitting results. The following Table 4 shows the results of a coated layer on a glass slide, and the water droplet contact angle measurement vs. rating correspondence was given using the criteria mentioned above.

TABLE 4

Comparison of Rolling Ratings and Static Contact Angles

| Rolling Rating | Static Contact Angles Measured |
| --- | --- |
| 0 | 117 ± 0.5° |
| 1 | 142 ± 2.5° |
| 2 | 144 ± 1.4° |
| 3 | 150 ± 2.5° |

INDIVIDUAL EXAMPLES

Examples 1 and 2

Examples 1 and 2 demonstrated the utilization of hydrophobic modification of aluminum silicates with hydrophobic silanes in solution phase, and the direct use of the modified particles in formulations to create coated hydrophobic layer.

Specifically, in Example 1, 2.7 µm median sized particles (P-1) were modified with 10 wt % of perfluorooctyltrimethoxysilane (F13) in toluene using the "Solution Modifications" method described above. Then, 2% of the hydrophobized particles were mixed with 1% of G-802 binder in acetone (Binder System 1, with no crosslinker). The spin coated layer of this coating composition had a rating of 3 on glass slides.

In Example 2, 2.7 µm median sized particles (P-1) were bonded with 10 wt % of octadecyltrimethoxysilane (C18) in toluene using the "Solution Modifications" method described above. Then, 2% of the hydrophobized particles were mixed with 1% of G-802 binder in acetone (Binder System 1, with no crosslinker). The spin coated layer of this coating composition had a rating of 3 on glass slides.

Example 3

Example 3 demonstrated the utilization of hydrophobic modification of aluminum silicates with hydrophobic silanes without a solvent, and the use of the modified particles in formulations to create coated hydrophobic layer.

Specifically, in Example 3, 5.5 µm median sized particles (P-2) were dry bonded with 10 wt % of CRTV944 silicone oil (Dry Modification method). Then, 2% of the hydrophobized particles were mixed with 1% of G-802 binder in acetone (Binder System 1). The spin coated layer of this coating composition had a rating of 3 on glass slides.

Examples 4-11

In Examples 4-11, 5.5 µm median sized P-1 particles were milled and bonded with 10 wt % of CRTV944 silicone oil in FEM (Milling and Modifications method). The hydrophobized particles had median particle size of around 4.0 µm. The hydrophobized particles were utilized in various formulations as indicated below in the following examples to create superhydrophobic surfaces.

Specifically, in example 4, the 4.0 µm median sized hydrophobized particles were used and 4% of the hydrophobized particles were mixed with 5% of G-802 binder with 0.2% of triallyl isocyanurate as cross-linker and 0.15% of dicumyl peroxide as described before in acetone (Binder System 1, with cross-linking). The spin coated layer of this coating composition had a rating of 3 on glass, wood, metal and HDPE substrates. Drawdowns were also carried out with these substrates, resulting in similar superhydrophobicity ratings. In another set of experiments, the same coating formulation was used to dip coat a fabric and paper, and after drying, the coated fabric and paper had superhydrophobic rating of 3.

Specifically, in example 5, the 4.0 µm median sized hydrophobized particles were used and 5% of the hydrophobized particles were mixed with 5% of G-802 binder with a cross-linker as described in Example 5 in acetone. The spin coated layer of this coating composition had a rating of 3 on glass.

Specifically, in example 6, the 4.0 µm median sized hydrophobized particles were used, and 1.9% of the hydrophobized particles were mixed with 2.86% of IROGRAN® A 85 P 4394 (TPU binder) in DMF (particle to binder ratio of 66.6%) (Binder System 2). The spin coated layer of this coating composition had a rating of 2 on wood with one coat, and 3 with two coats (120° C. thermal treatment for 1 hour after each coat).

Specifically, in example 7, the 4.0 µm median sized hydrophobized particles were used, and the hydrophobized particles were dispersed in water under high shear with Triton X-100, and then were mixed with WP-30C aqueous binder with a final concentration of 2% particles, and 5% of binders as described (Binder System 3). The spin coated layer of this coating composition had a rating of 0 on glass, but 3 on wood.

Specifically, in example 8, the 4.0 µm median sized hydrophobized particles were used, and the hydrophobized particles were dispersed in water under high shear with Triton X-100, and then were mixed with WP-30C aqueous binder with a final concentration of 2% particles, and 5% of binders as described (Binder System 3). The spin coated layer of this coating composition had a rating of 0 on glass, but 3 on wood.

Specifically, in example 9, the 4.0 µm median sized hydrophobized particles (prepared as that described in Example 4) were used, and the modified particles were dispersed in water under high shear with 4.2% of Triton X-100, and then were mixed with CANVERA™ 1110 (PO aqueous emulsion binder) with a final concentration of 2% particles, and 2% of binders as described (Binder System 4). The spin coated layer of this coating composition had a rating of 0 on glass, but 2 on wood.

Specifically, in Example 10, 4.0 µm median sized hydrophobized particles were used, and the hydrophobized particles were mixed with CRTV942 silicone oil, 5% TEOS cross-linker, and 2.5% of catalyst as discussed in the method section (Binder System 5). The final concentration of the coating composition contained 5% of particles and 5% of binders. The mixture was coated onto glass and wood substrate with a rating of 3 respectively.

Specifically, in example 11, the 4.0 µm median sized hydrophobized particles were used, and the hydrophobized particles were mixed with CRTV942 silicone oil, 5% TEOS cross-linker and 2.5% of catalyst as discussed in the method section (Binder System 5). The final concentration of the coating composition contained 10% of particles and 10% of binders. The mixture was coated onto wood substrate with a rating of 3 respectively.

Examples 12-17

In Examples 12-17, the influence of weight ratios of the hydrophobically modified particles and the binders on the superhydrophobic performance was studied.

Specifically, in Example 12, 5.5 µm median sized P-1 particles were milled and bonded with 10 wt % of CRTV944 silicone oil in FEM. The hydrophobized particles had median particle size of around 4.0 µm. The hydrophobized particles and G-802 binder were blended in a toluene/acetone solvent mixture. Table 5 shows that the superhydrophobicity rating on glass slides with spin coating with wt % of the particles and different amounts of binder:

TABLE 5

Influence of Particle Binder Ratios on Performance

| Sample Identification | The Amount of Particles in Formulation (wt %) | The Amount of G-802 Binder in Formulation (wt %) | Ratios of Particles to Binder | Super-hydrophobicity Rating on Spin Coated Glass Sides |
|---|---|---|---|---|
| 12 | 2% | 2% | 1:1 | 3 |
| 13 | 2% | 3% | 1:1.5 | 3 |
| 14 | 2% | 4% | 1:2 | 3 |
| 15 | 2% | 5% | 1:2.5 | 2 |
| 16 | 2% | 8% | 1:4 | 0 |
| 17 | 2% | 10% | 1:5 | 0 |

As shown from the above table, in one embodiment, to obtain the superhydrophobicity of the coated layer, the particle to binder weight ratio is equal to or higher than 1:2.5 (about 28 wt % in total dried coated film).

Examples 18-29

Examples 18-29 demonstrates the importance of particle pore diameter for the superhydrophobicity performance of the coating films utilizing chemically modified particles.

In Examples 18-29, the modification method of the particles was dry modification, and the formulation method was preparation method 1 (both as described earlier). The weight ratio of the particle and the binder was 1:1 (5 wt % each in formulation), and the coating method was spin coating on glass slides.

Table 6 lists the amount of PDMS used in the particle modifications, and the results from the coated films utilized these modified particles.

TABLE 6

Influence of Particle Pore Diameters on Performance

| Example # | Particle Choice | Particle Size (µm) | Particle Pore Diameter (Å) | Weight % of PDMS Used | Hydrophobic Rating on Glass Slides |
|---|---|---|---|---|---|
| 18 | P-3 | 3.1 | 30 | 45.3 | 0 |
| 19 | P-4 | 2.6 | 40 | 53.3 | 0 |
| 20 | P-5 | 1.2 | 101 | 20.7 | 3 |
| 21 | P-6 | 5.2 | 153 | 15.5 | 3 |
| 22 | P-7 | 5.0 | 161 | 11.0 | 3 |
| 23 | P-8 | 5.0 | 193 | 11.2 | 3 |
| 24 | P-9 | 5.0 | 135 | 7.0 | 3 |

TABLE 6-continued

Influence of Particle Pore Diameters on Performance

| Example # | Particle Choice | Particle Size (µm) | Particle Pore Diameter (Å) | Weight % of PDMS Used | Hydrophobic Rating on Glass Slides |
|---|---|---|---|---|---|
| 25 | P-10 | 0.9 | 148 | 5.0 | 2 |
| 26 | | | | 10.0 | 3 |
| 27 | | | | 20.0 | 3 |
| 28 | | | | 35.0 | 3 |
| 29 | | | | 50.0 | 2 |

Specifically, in Examples 18 and 19, sodium aluminum silicate particles with pore diameter of less than 100 Å were treated with 45 or 53% PDMS, and then 5% modified particles were formulated with 5% of G-802 binder with 0.2% of triallyl isocyanurate as cross-linker and 0.15% of dicumyl peroxide as described before in acetone. The spin coated layer of both coating compositions had ratings of 0 on glass.

Specifically, in Examples 20 to 24, sodium aluminum silicate particles or sodium magnesium aluminum silicate particles with pore diameter of over 100 Å were treated with different levels of PDMS (as amounts indicated in Table 7), and then 5% modified particles were formulated with 5% of G-802 binder with 0.2% of triallyl isocyanurate as cross-linker and 0.15% of dicumyl peroxide as described before in acetone. The spin coated layer of the coating compositions all had ratings of 3 on glass.

Specifically, in Examples 25 to 29, sodium magnesium aluminum silicate particles with pore diameter of 148 Å were treated with different levels of PDMS (from 5 wt % to 50 wt % of that of the particles), and then 5% modified particles were formulated with 5% of G-802 binder with 0.2% of triallyl isocyanurate as cross-linker and 0.15% of dicumyl peroxide as described before in acetone. The spin coated layer of the coating compositions had ratings of 3 on glass for particles treated with 10-35 wt % of PDMS, and 2 for the 5% and the 50% PDMS.

Examples 30-32

Examples 30-32 demonstrated the feasibility of alternative formulations. 5.5 µm median sized particles (P-2) were dry bonded with 10 wt % of CRTV944 silicone oil (Dry Modification method).

Specifically, in Example 30, the hydrophobic modified particles were used in a formulation utilizing Binder System 6 and with a procedure as described. The coating surface on glass and metal surface had rating of 3.

Specifically, in Example 31, the hydrophobic modified particles were used in a formulation utilizing Binder System 7 and with a procedure as described. The coating surface on glass and metal surface had rating of 3.

Specifically, in Example 32, the hydrophobic modified particles were used in a formulation utilizing Binder System 8 and with a procedure as described. The coating surface on glass and metal surface had rating of 3.

The invention claimed is:
1. A coating composition, comprising:
hydrophobized aluminum silicate particles;
a film-forming binder comprising a fluorine containing polymer; and
a solvent,
wherein the hydrophobized aluminum silicate particles comprise aluminum silicate particles having a pore diameter of about 50 Å or more and a hydrophobic coating on a surface of the aluminum silicate particles, and wherein a weight ratio of the hydrophobized aluminum silicate particles to the film-forming binders in the coating composition is at least about 1:2.5.

2. The coating composition according to claim 1, wherein the aluminum silicate particles have a pore diameter of about 60 Å or more.

3. The coating composition according to claim 1, wherein the hydrophobic coating is in an amount of not more than 10% by weight based on a total weight of the aluminum silicate particles and the hydrophobic layer.

4. The coating composition according to claim 1, wherein the solvent comprises one or more organic solvents or water.

5. The coating composition according to claim 1, wherein the aluminum silicate particles have a median particle size ranging from about 0.5 μm to about 50 μm.

6. The coating composition according to claim 1, wherein the hydrophobized aluminum silicate particles have a median particle size ranging from about 1 μm to about 15 μm.

7. The coating composition according to claim 1, wherein a BET surface area of the aluminum silicate particles is less than about 150 m$^2$/g.

8. The coating composition according to claim 1, wherein the aluminum silicate particles comprise an alkali metal/alkaline earth metal aluminum silicate.

9. The coating composition according to claim 8, wherein the alkali metal/alkaline earth metal aluminum silicate contains at least an alkali metal selected from the group consisting of lithium, sodium, potassium, rubidium, cesium, and mixtures thereof.

10. The coating composition according to claim 8, wherein the alkali metal/alkaline earth metal aluminum silicate contains at least an alkaline earth metal selected from the group consisting of beryllium, magnesium, calcium, strontium, barium, radium and mixtures thereof.

11. The coating composition according to claim 8, wherein the alkali metal/alkaline earth metal aluminum silicate is sodium magnesium aluminum silicate.

12. The coating composition according to claim 1, wherein the hydrophobic coating on the surface of the aluminum silicate particles is formed by contacting the aluminum silicate particles with a hydrophobic silane or siloxane that contains at least one reactive functional group that undergoes a chemical reaction with surface silanol groups of the aluminum silicate particles.

13. The coating composition according to claim 12, wherein the hydrophobic silane or siloxane has a molecular weight of at least 200.

14. The coating composition according to claim 13, wherein the hydrophobic silane or siloxane is a (perfluoro)alkyl silane, a (perfluoro)alkyl siloxane, or a mixture thereof.

15. The coating composition according to claim 13, wherein the hydrophobic silane or siloxane is octadecyl trimethoxysilane, perfluorooctyltrimethoxysilane, polydimethoxysilane, or silanol terminated polydimethylsiloxane.

16. The coating composition according to claim 13, wherein the hydrophobized aluminum silicate particles are contacted with the hydrophobic silane or siloxane by a solution modification process, a dry modification process, or a milling and modification process.

17. The coating composition according to claim 16, wherein in the milling and modification process, the aluminum silicate particles are milled and modified with the hydrophobic silane or siloxane in a spiral jet mill to obtain the hydrophobized aluminum silicate particles having a median particle size ranging from about 0.1 μm to about 50 μm.

18. The coating composition of claim 17, wherein the hydrophobized aluminum silicate particles have a median particle size ranging from about 1 μm to about 15 μm.

19. The coating composition according to claim 1, wherein the solvent comprises one or more organic solvents.

20. The coating composition according to claim 19, wherein the fluorine-containing polymer is polytetrafluoroethylene, polyhexafluoropropene, tetrafluoroethylene hexafluoropropene copolymer, alkoxy fluoroethylene copolymer, ethylene-tetrafluoroethylene copolymer, or a combination thereof.

21. The coating composition according to claim 19 further comprising a cross-linker for crosslinking the film-forming binder.

22. The coating composition according to claim 21 wherein the coating composition further comprises an initiator and the cross-linker comprises two or more carbon-carbon double bonds.

23. The coating composition according to claim 19, wherein the film-forming binder further comprises a gelation agent.

24. The coating composition according to claim 23, wherein the film-forming binder comprises an aqueous wax emulsion or an aqueous emulsion of the hydrophobic polymer and the solvent comprises water.

25. The coating composition according to claim 24, wherein the coating composition is prepared by dispersing the hydrophobized aluminum silicate particles in water in a presence of a surfactant to form a suspension of the hydrophobized aluminum silicate particles, and then mixing the wax emulsion or the emulsion of the hydrophobic polymer with the suspension of the hydrophobized aluminum silicate particles.

26. The coating composition according to claim 1, wherein the film-forming binder is present in an amount of about 1% to about 30% by weight of the coating composition.

27. The coating composition according to claim 1, wherein the coating composition is in a form of aerosol further comprising at least one propellant.

28. A hydrophobic film formed from the coating composition according to claim 1, wherein the hydrophobic film exhibits a static contact angle for deionized water at room temperature equal to or greater than about 140° and a rolling rating of at least 1 in a scale of 0-3.

29. The hydrophobic film according to claim 28, wherein the hydrophobic film is produced by a method selected from the group consisting of spin coating, dip coating, spray coating, roller coating, drawdown, brush coating, and a mixture thereof.

* * * * *